US011099289B2

United States Patent
Dev et al.

(10) Patent No.: US 11,099,289 B2
(45) Date of Patent: Aug. 24, 2021

(54) MULTIVARIATE ANALYSIS OF SEISMIC DATA, MICROSEISMIC DATA, AND PETROPHYSICAL PROPERTIES IN FRACTURE MODELING

(71) Applicant: Landmark Graphics Corporation, Houston, TX (US)

(72) Inventors: Ashwani Dev, Katy, TX (US); Sridharan Vallabhaneni, College Station, TX (US); Raquel Morag Velasco, Houston, TX (US); Jeffrey Marc Yarus, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 216 days.

(21) Appl. No.: 16/331,635

(22) PCT Filed: Oct. 4, 2016

(86) PCT No.: PCT/US2016/055285
§ 371 (c)(1),
(2) Date: Mar. 8, 2019

(87) PCT Pub. No.: WO2018/067119
PCT Pub. Date: Apr. 12, 2018

(65) Prior Publication Data
US 2019/0235106 A1 Aug. 1, 2019

(51) Int. Cl.
*G01V 1/28* (2006.01)
*G01V 1/30* (2006.01)
(Continued)

(52) U.S. Cl.
CPC .............. *G01V 1/282* (2013.01); *G01V 1/288* (2013.01); *G01V 1/301* (2013.01); *G01V 1/42* (2013.01);
(Continued)

(58) Field of Classification Search
CPC ......... G01V 1/282; G01V 1/288; G01V 1/301
See application file for complete search history.

(56) References Cited

U.S. PATENT DOCUMENTS 8,064,287 B2   11/2011   Harris et al.
8,392,165 B2   3/2013    Craig et al.
(Continued)

FOREIGN PATENT DOCUMENTS

WO   WO 2014/055186 A1   4/2014
WO   WO 2014/055931 A1   4/2014
(Continued)

OTHER PUBLICATIONS

International Search Report and the Written Opinion, dated Jun. 29, 2017, PCT/US2016/055285, 12 pages, ISA/KR.
(Continued)

*Primary Examiner* — Manuel A Rivera Vargas (57) ABSTRACT

A multivariate analysis may be used to correlate seismic attributes for a subterranean formation with petrophysical properties of the subterranean formation and/or microseismic data associated with treating, creating, and/or extending a fracture network of the subterranean formation. For example, a method may involve modeling petrophysical properties of a subterranean formation, microseismic data associated with treating a complex fracture network in the subterranean formation, or a combination thereof with a mathematical model based on measured data, microseismic data, completion and treatment data, or a combination thereof to produce a petrophysical property map, a microseismic data map, or a combination thereof; and correlating a seismic attribute map with the petrophysical property map, the microseismic data map, or the combination thereof using the mathematical model to produce at least one quantified
(Continued)

correlation, wherein the seismic attribute map is a seismic attributed modeled for the complex fracture network.

20 Claims, 6 Drawing Sheets

(51) Int. Cl.

| | |
|---|---|
| *G06Q 50/02* | (2012.01) |
| *G01V 1/42* | (2006.01) |
| *G01V 1/50* | (2006.01) |
| *G01V 11/00* | (2006.01) |
| *G06Q 10/06* | (2012.01) |

(52) U.S. Cl.
CPC ............... *G01V 1/50* (2013.01); *G01V 11/00* (2013.01); *G06Q 10/06* (2013.01); *G06Q 50/02* (2013.01); *G01V 1/307* (2013.01); *G01V 1/308* (2013.01); *G01V 2210/121* (2013.01); *G01V 2210/1234* (2013.01); *G01V 2210/6122* (2013.01); *G01V 2210/6163* (2013.01); *G01V 2210/6165* (2013.01); *G01V 2210/6167* (2013.01); *G01V 2210/6169* (2013.01); *G01V 2210/63* (2013.01); *G01V 2210/646* (2013.01)

(56) References Cited

U.S. PATENT DOCUMENTS

| | | | |
|---|---|---|---|
| 8,437,962 B2 | 5/2013 | Craig | |
| 8,898,044 B2 | 11/2014 | Craig | |
| 9,176,245 B2 | 11/2015 | Craig | |
| 2007/0272407 A1* | 11/2007 | Lehman | .................. E21B 43/26 166/250.1 |
| 2011/0110191 A1 | 5/2011 | William-Stroud et al. | |
| 2012/0221306 A1 | 8/2012 | Hurley et al. | |
| 2013/0000895 A1 | 1/2013 | Walters et al. | |
| 2015/0120197 A1 | 4/2015 | Xu | |

FOREIGN PATENT DOCUMENTS

| | | |
|---|---|---|
| WO | WO 2015/117118 A1 | 8/2015 |
| WO | WO 2015/187150 A1 | 12/2015 |

OTHER PUBLICATIONS

Jones et al., Fracture Detection Interpretation Beyond Conventional Seismic Approaches, Search and Discovery Article #41035, AAPG Eastern Section meeting, Cleveland, OH, 2012.

Khair et al., Natural Fracture Networks Enhancing Unconventional Reservoirs' Producibility: Mapping & Predicting, Search and Discovery Article #41182, AAPG Annual Convention and Exhibition, Pittsburgh, PA 2013.

French Patent Office, Application No. FR1758597, Preliminary French Search Report and Written Opinion, dated Feb. 21, 2019, 10 pages, France.

D. Maity, and F. Aminzadeh, Fracture Characterization in Unconventional Reservoirs using Active and Passive Seismic Data with Uncertainty Analysis through Geostatistical Simulation, SPE 166307, Sep. 30-Oct. 2, 2013, 16 pages, SPE Annual Technical Conference and Exhibition, New Orleans, Louisiana.

Atul Kumar, Mohd Haris Mohd Khir, and Wan Ismail Wan Yusoff, A model-based approach for integration analysis of well log and seismic data for reservoir characterization, Geosciences Journal, The Association of Korean Geoscience Societies and Springer, vol. 20—No. 3, Jun. 2016, 20 pages, Korea.

Scott Singleton, and Mark Suda, Geophysicists Boost Workflow's Valve, The American Oil & Gas Reporter, Nov. 2012, 5 pages, The "Better Business" Publication Serving the Exploration / Drilling / Production Industry United States.

C. Mike Du, Xu Zhang, Y. Zee Ma, Peter Kaufman, Brad Melton and Sherif Gowelly, Integrated Shale Gas Reservoir Modeling, AAPG Memoir Journal, Dec. 2011, 31 pages.

* cited by examiner

|  | Likelihood | Magnitude | Neg Curvatures | Pos Curvatures |
|---|---|---|---|---|
|  | 0.270 | | | |
|  | −0.371 | −0.003 | | |
|  | 0.450 | 0.072 | −0.038 | |

FIG. 5

|  | AI_P | AI_S | Brittleness | Simulated Brittleness | DT | GR | Likelihood | Negative Curvatures | PEF |
|---|---|---|---|---|---|---|---|---|---|
| AI_S | 0.357 | | | | | | | | |
| Brittleness | 0.502 | 0.219 | | | | | | | |
| Simulated Brittleness | 0.477 | 0.007 | 0.465 | | | | | | |
| DT | -0.544 | -0.202 | -0.932 | -0.419 | | | | | |
| GR | -0.606 | -0.130 | -0.843 | -0.501 | 0.861 | | | | |
| Likelihood | 0.911 | -0.565 | 0.326 | 0.474 | -0.376 | -0.455 | | | |
| Negative Curvatures | 0.402 | 0.377 | 0.599 | 0.531 | -0.503 | -0.464 | 0.282 | | |
| PEF | 0.673 | 0.032 | 0.819 | 0.506 | -0.872 | -0.827 | 0.553 | 0.465 | |
| Positive Curvatures | 0.837 | -0.191 | 0.598 | 0.686 | -0.555 | -0.602 | 0.732 | 0.583 | 0.679 |

FIG. 6

MULTIVARIATE ANALYSIS OF SEISMIC DATA, MICROSEISMIC DATA, AND PETROPHYSICAL PROPERTIES IN FRACTURE MODELING

CROSS-REFERENCE TO RELATED APPLICATIONS

The present application is a U.S. National Stage patent application of International Patent Application No. PCT/US2016/055285, filed on Oct. 4, 2016, the benefit of which is claimed and the disclosure of which is incorporated herein by reference in its entirety.

BACKGROUND

The present application relates to methods and systems for modeling fracture networks of subterranean formations.

Oil and gas wells produce oil, gas, and/or byproducts from subterranean petroleum reservoirs. Petroleum reservoirs, such as those containing oil and gas, typically include finite-dimensional, discontinuous, inhomogeneous, anisotropic, non-elastic (DIANE) rock formations. Such formations, in their natural state (prior to any fracturing treatment), typically include faults and natural fracture networks. As used herein, the term "natural fracture network" refers to the collection of fractures, connected or disconnected, within a subterranean formation before any fracturing treatment. The fractures in a natural fracture network may have various sizes, shapes, orientations, and lithographic composition. Further, natural fractures may be open, closed, partially open, or partially filled. For example, a natural fracture in a subterranean formation may be partially filled a different lithographic composition like a calcite, dolomite, silica, or the like, which may be identified in the seismic data.

During a hydraulic fracturing treatment, fluids are pumped under high pressure into a rock formation through a wellbore to cause or form fractures in the formations and increase permeability and production from the formation. Fracturing treatments (as well as production and other activities) can induce varied fracture patterns to develop within the formation. As used herein, the term "complex fracture network" refers to the collection of both natural fractures and induced fractures, connected or disconnected, within a subterranean formation. Complex fracture networks may include fractures that extend from the wellbore, along multiple azimuths, in multiple different planes and directions, along discontinuities in rock, and in multiple regions of a formation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present application relates to methods and systems that utilize multivariate analysis when modeling fracture networks of subterranean formations. More specifically, the multivariate analysis involves correlating seismic attributes (e.g., fault likelihood, curvature attributes, seismic impedance, and the like) for a subterranean formation with petrophysical properties of the subterranean formation and/or microseismic data associated with treating, creating, and/or extending a fracture network of the subterranean formation. These correlations may enhance the differentiation between natural and induced fractures within a complex fracture network by identifying the origin of microseismic events, which may improve the completion design and reservoir modeling.

As used herein, the term "seismic attribute" refers to a chemical or physical property of the subterranean formation derived from seismic data. Exemplary seismic attributes may include, but are not limited to, fault likelihood, curvature attributes, seismic impedance, and the like. As used herein, the term "fault likelihood" refers to a probability that a fault exists at a given location. In some instances, fault likelihood may be reported as a likelihood volume computed using the fault oriented semblance algorithm described by Hale (*GEOPHYSICS*, VOL. 78, NO. 2 (MARCH-APRIL 2013), P. O33-O43, *Methods to compute fault images, extract fault surfaces, and estimate fault throws from 3D seismic images*). In this example, the likelihood scale varies from 0 (no fault) to 1 (high likelihood of locating a fault in the volume). Other scales may be used.

As used herein, the term "petrophysical property" refers to a chemical or physical property of a rock lithology of a subterranean formation including any chemical or physical interactions between the rock and a fluid contained therein. Exemplary petrophysical properties may include, but are not limited to, sonic and shear impedances, mineralogy, porosity, permeability, relative permeability, capillarity, saturation, brittleness, matrix density, composition, stresses of the formation, and the like, and any combination thereof. In some instances, the correlation between seismic attributes and a petrophysical property may be direct where a distinct value for the petrophysical property is used in the correlation. Alternative to or in combination with direct correlation, the correlation between seismic attributes and a petrophysical property may be indirect where measured data of the subterranean formation that relates to the petrophysical property are used in the correlation. For example, gamma ray measurements, nuclear magnetic resonance measurements, and sonic measurements of a subterranean formation relate to the porosity. In a direct correlation, one or more of the foregoing measurements may be used to calculate porosity that is then correlated to a seismic attribute. In an indirect correlation, one or more of the foregoing measurements may be correlated to the fault likelihood. Unless otherwise specified, the terms "correlate" and derivatives thereof when referring to a correlation between seismic attributes and a petrophysical property encompasses direct correlations, indirect correlations, and a combination of direct and indirect correlations. Further, unless otherwise specified, the terms "correlation between seismic attributes and a petrophysical property" and derivatives thereof encompasses correlation between seismic attributes and the petrophysical property, correlation between that seismic attribute and the measured data of the subterranean formation that relates to the petrophysical property, and any combination thereof.

As used herein, "measured data that relates to the petrophysical property" refers to data directly measured by a sensor and/or data derived or otherwise calculated from data measured by a sensor, wherein, whether directly measured or derived/calculated, the data relates to a petrophysical property of the formation. The measured data that relates to the petrophysical property may be from, for example, nuclear magnetic resonance measurements, gamma ray measurements, photoelectric measurements, neutron measurements, geochemical measurements, resistivity measurements, acoustic measurements, borehole imaging measurements, mud logs, core sample measurements, geomechanical measurements, and the like, and any combination thereof, which may be collected with surface tools, measurement-while-drilling (MWD) tools, logging-while-drilling (LWD) tools, wireline tools, or combinations thereof. More specifically, examples of measured data may include, but are not limited to, p-wave acoustic impedance (which relates to in-situ stresses of the formation), s-wave shear impedance (which relates to in-situ stresses of the formation), slowness in the formation (derived from a sonic measurements, which relates to porosity), gamma rays (which relates to minerology), positive or negative sonic curvature (which relates to structural changes that relate to potential fracturing), photoelectric factor (which relates to rock matrix properties and density), Young's modulus and Poisson's ratio (which relate to the elastic properties of the formation and derived using sonic velocity, shear velocity and density; it also relates to the formation stress), and the like, and any combination thereof.

Hydraulic fracturing treatments (also referred to herein as "fracturing treatments") are typically conducted to create fractures in the subterranean formation, and to thereby enhance hydrocarbon productivity of the subterranean formation. The pressures generated by the fracturing treatment can induce low-amplitude or low-energy seismic events in the subterranean formation, known as microseismic events. Other treatments to a fracture network may cause microseismic events that may be monitored to acquire microseismic data for analysis. For example, stimulation operations like injections and steam assisted gravity drainage treatments to a fracture network may cause microseismic events.

As used herein, the term "microseismic event" refers to a micro-earthquake that originates as a result of changing the stress distribution within a subterranean formation, for example, in response to hydraulic fracturing treatments or other treatments to the fracture network. Microseismic events may originate from, for example, rock slips, rock movements, rock fractures, or other events in the subterranean formation.

The seismic waves produced by microseismic events are detected by sensors, and, then, the microseismic waveforms detected by the sensors may be processed and analyzed to determine the size and location in time and space of the microseismic events and various attributes associated with the microseismic data. Sensors may be placed in a plurality of locations relative to the wellbore in which the treatment is being conducted, for example, in a well (e.g., an observation well, an injection well, a treatment well, or a production well) that is sufficiently close to the fracture network to measure microseismic data, at the Earth's surface, buried at shallow depth (less than about 500 m), and the like, and any combination thereof. Generally, the sensors measure microseismic data from one or more of the foregoing locations prior to, during, and after the treatment.

Exemplary sensors used to detect microseismic events may include, but are not limited to, geophones, accelerometers, fiber optics distributed acoustic sensors (DAS), and the like, and any combination thereof. Generally, more than one sensor (e.g., two or more of a single type of sensor or a combination of two or more types of sensors) may be used in a sensor array.

Exemplary microseismic data may include, but are not limited to, magnitude of the microseismic events, relative time of microseismic events, location in space and time of the microseismic events, source mechanism of microseismic events, p-wave to s-wave amplitude ratios, signal to noise ratios, seismic moment, amount of shear associated with microseismic events, microseismic moment tensors, confidence value of the microseismic events, density of microseismic events, geometry of induced fractures estimated from microseismic events, and the like, and any combination thereof.

Microseismic data may be collected in association with treating, creating, and/or extending a fracture network. The microseismic data may be acquired before the treatment begins, during the treatment, after the treatment has terminated, or any combination thereof.

The systems and methods of the present application correlate seismic attributes for a subterranean formation with one or more petrophysical properties of the subterranean formation and/or microseismic data associated with treating a complex fracture network in a subterranean formation for identifying natural and induced fractures within the complex fracture network.

Figure 1:
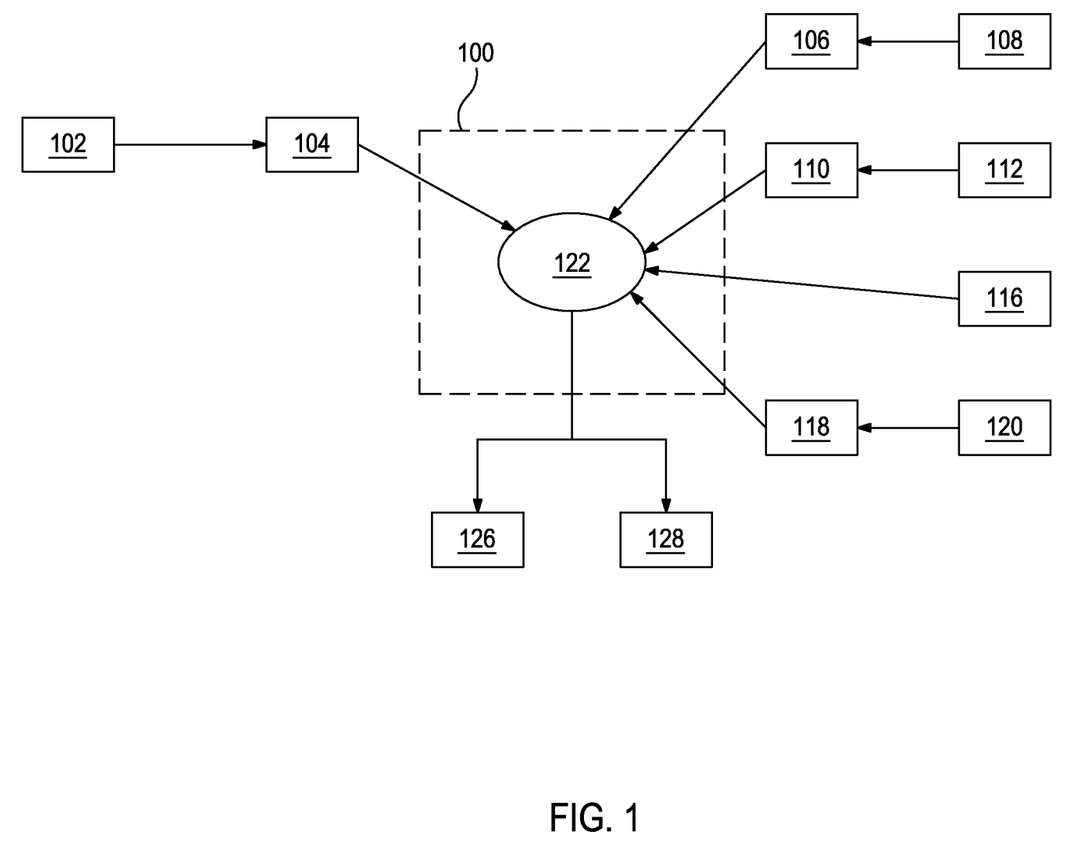
FIG. 1 is a flow diagram of a method that uses a mathematical model to correlate petrophysical properties, seismic attributes, and microseismic data according to at least some embodiments of the present disclosure.

FIG. 1 is a flow diagram of a method that uses a mathematical model 100 to determine a correlation 122 between seismic attributes 104 with petrophysical properties 106,110 of the subterranean formation and/or microseismic data maps 118 associated with treating a complex fracture network according to at least some embodiments of the present disclosure.

More specifically, as illustrated, measured data like well logs 108 and geochemical and core data 112 may be processed deterministically (e.g., using a Kriging process) or stochastically (e.g., using conditional simulations) to produce petrophysical property maps 106,110, respectively.

As used herein, the term "map" refers to a given characteristic and/or property represented as a 3-dimensional grid matrix of the subterranean formation (also known as a geocellular grid), a 2-dimensional array representing the formation properties on a 2-dimensional plane, a 1-dimensional array representing the subterranean formation, and the like. In a 1-dimensional array, the data points of the formation (e.g., the data points in the geocellular grid) are converted to a mathematical matrix having matrix identification values corresponding to each of the data points in the geocellular grid.

Petrophysical property maps 106,110 may be of a specific petrophysical property for direct correlations with the seismic attribute map 104 or of measurements/data related to the petrophysical property for indirect correlations as described above.

Further, microseismic data 120 may be processed deterministically or stochastically to produce microseismic data maps 118.

In some instances, additional mathematical analyses and manipulations may be performed, prior to or during the modelling, which may include, but are not limited to, normalizing data gathered (e.g., the well log data 108, the geochemical and core data 112, the seismic data 102, and the microseismic data 120), calibrating the mathematical mode 100 to any remotely sensed data (e.g., the well log data 108, the geochemical and core data 112, the seismic data 102, and the microseismic data 120), and the like, and any combination thereof.

The measured data (e.g., well log data 108 and the geochemical and core data 112) may be from one or more measurements of the subterranean formation, for example, nuclear magnetic resonance measurements, gamma ray measurements, photoelectric measurements, neutron measurements, geochemical measurements, resistivity measurements, acoustic measurements, borehole imaging measurements, mud logs, geomechanical measurements, and the like, and any combination thereof, which may be collected with MWD tools, LWD tools, wireline tools, or combinations thereof. In some instances, the measured data 108,112,116 may be collected in association with treating a complex fracture network.

The petrophysical property maps 106,110 and microseismic data maps 118 may be a model of one or more properties or characterizations of the subterranean formation that relate to the fractures therein including those described herein related to the seismic attribute map 104.

Further, the completion and treatment data 116 (e.g., pump rates, flow rates, wellbore pressures, and the like) may be collected.

The mathematical model 100 may then apply a multivariate analysis of the seismic attribute map 104, the petrophysical property maps 106,110, the completion and treatment data 116, and the microseismic data maps 118 to quantify the correlation 122 between the seismic attribute map 104 and each of the petrophysical property maps 106,110, the completion and treatment data 116, and the microseismic data maps 118. The multivariate analysis may involve simple linear or nonlinear regression to determine the correlation coefficient, the coefficient of determination, or any other goodness-of-fit statistical method.

In instances, the correlation (P) scale may vary from 0 (no correlation) to 1 (high correlation). Other scales may be used. In instances where the correlation 122 is poor (e.g., P<0.5), the seismic data 102, the measured data 108,112, the completion and treatment data 116, and the microseismic data 120 may be reviewed to determine if potentially false data is present and remove the false data.

In instances where the correlation 122 is good (e.g., P>0.7 or $P^2$>0.5), the petrophysical property maps 106,110, the completion and treatment data 116, and the microseismic data maps 118 having the good correlation 122 to the seismic attribute map 104 may be used as the basis for further analysis and/or modelling of the subterranean formation (e.g., variogram modelling 126 and reservoir modeling 128).

For example, with variogram modelling 126, the petrophysical property maps 106,110, the completion and treatment data 116, and the microseismic data maps 118 having the good correlation 122 to the seismic attribute map 104 may be used as the basis for identifying natural and induced fractures within the complex fracture network. By way of nonlimiting example, overlaying the microseismic data maps 118 on the seismic attribute map 104 may identify microseismic events occurring along likely faults as reactivation of natural fractures and identify other microseismic events as being along induced fractures. Further, comparison with the petrophysical properties such as brittleness may be further used to identify induced fractures along brittle portions of the formation.

In another example, with reservoir modeling 128, the petrophysical property maps 106,110, the completion and treatment data 116, and the microseismic data maps 118 having the good correlation 122 to the seismic attribute map 104 may be used as the basis for determine a location for drilling a new well into the subterranean formation that intersects the complex fracture network. For example, the location for drilling a new well may be selected to intersect a highly connected portion of the complex fracture network.

Also, the methods described herein may be used to assess the effectiveness of the treatment. Then, the completion and treatment data 116 having the good correlation 122 to the seismic attribute map 104 may be used for future completions and treatment design of nearby wells.

Further, the petrophysical property maps 106,110, the completion and treatment data 116, and the microseismic data maps 118 having the good correlation 122 to the seismic attribute map 104 may be used to (1) improve reservoir production modelling or forecasting, (2) improve fracture modeling (e.g., to model the degree and position of fracture clustering), and (3) inform in-fill drilling decisions in a portion of the subterranean formation of interest.

The analyses and methods described herein may be implemented by a set of instructions that cause a processor to perform the mathematical model 100. In some instances, the processor and set of instructions may also be used for subsequent analyses of the petrophysical property maps 106,110, the completion and treatment data 116, and the microseismic data maps 118 having the good correlation 122 to the seismic attribute map 104.

The processor may be a portion of computer hardware used to implement the various illustrative blocks, modules, elements, components, methods, and algorithms described herein. The processor may be configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMs, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to the processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Figure 2:
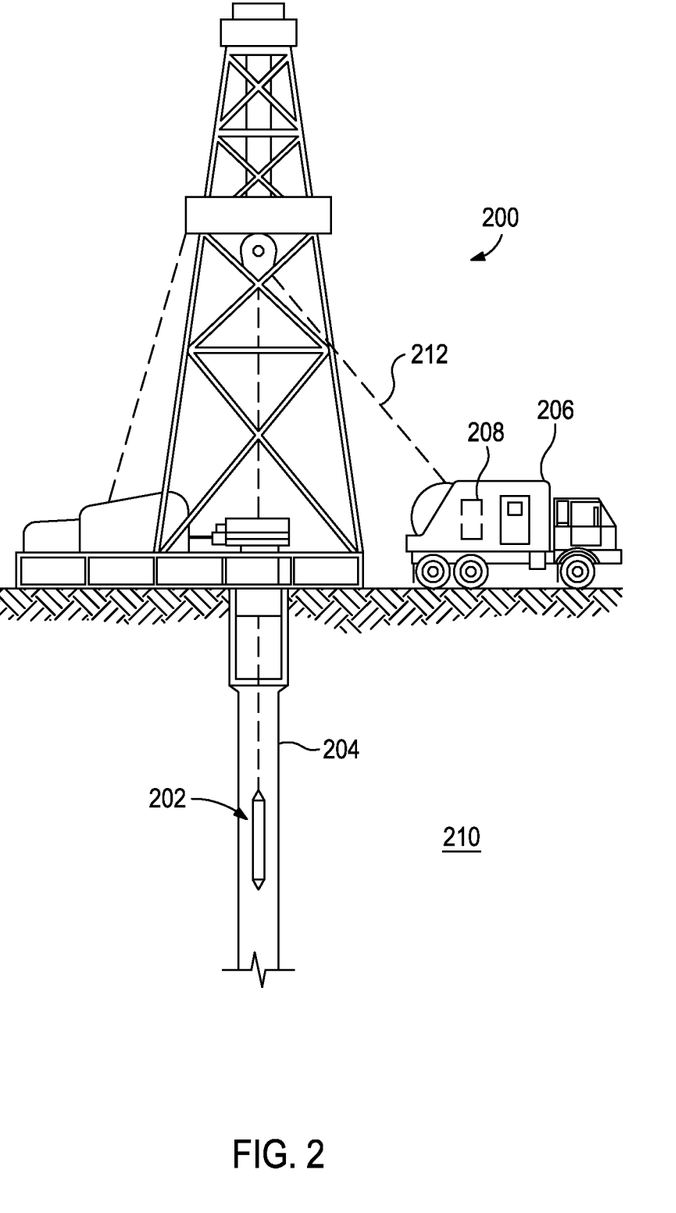
FIG. 2 depicts a schematic diagram of an exemplary wireline system that may employ the principles of the present disclosure.

FIG. 2 depicts a schematic diagram of an exemplary wireline system 200 that may employ the principles of the present disclosure, according to one or more embodiments. At various times before, during, or after one or more treatments of the complex fracture network, seismic data 102, measured data 108,112, and microseismic data 120 of FIG. 1 may be collected for a subterranean formation 210. In some instances, the wellbore tools extending into a wellbore 204 (e.g., a work string for perforating the formation 210) may be removed from a wellbore 204 to conduct measurement/logging operations. As illustrated, the wireline system 200 may include a one or more wireline tools 202 that may be suspended into the wellbore 204 by a cable 212. The wireline tools 202 may be communicably coupled to the cable 212. The cable 212 may include conductors for transporting power to the wireline tools 202 and also facilitate communication between the surface and the wireline tools 202. A logging facility 206, shown in FIG. 2 as a truck, may collect measurements from the wireline tools 202, and may include computing facilities 208 for controlling, processing, storing, and/or visualizing the measurements gathered by the wireline tools 202. The computing facilities 208 may be communicably coupled to the wireline tools 202 by way of the cable 212. In some instances, the mathematical model 100 of FIG. 1 may be implemented using the computing facilities 208. Alternatively, the measurements gathered by the wireline tools 202 may be transmitted (wired or wirelessly) or physically delivered to computing facilities off-site where the mathematical model 100 of FIG. 1 may be implemented.

Figure 3:
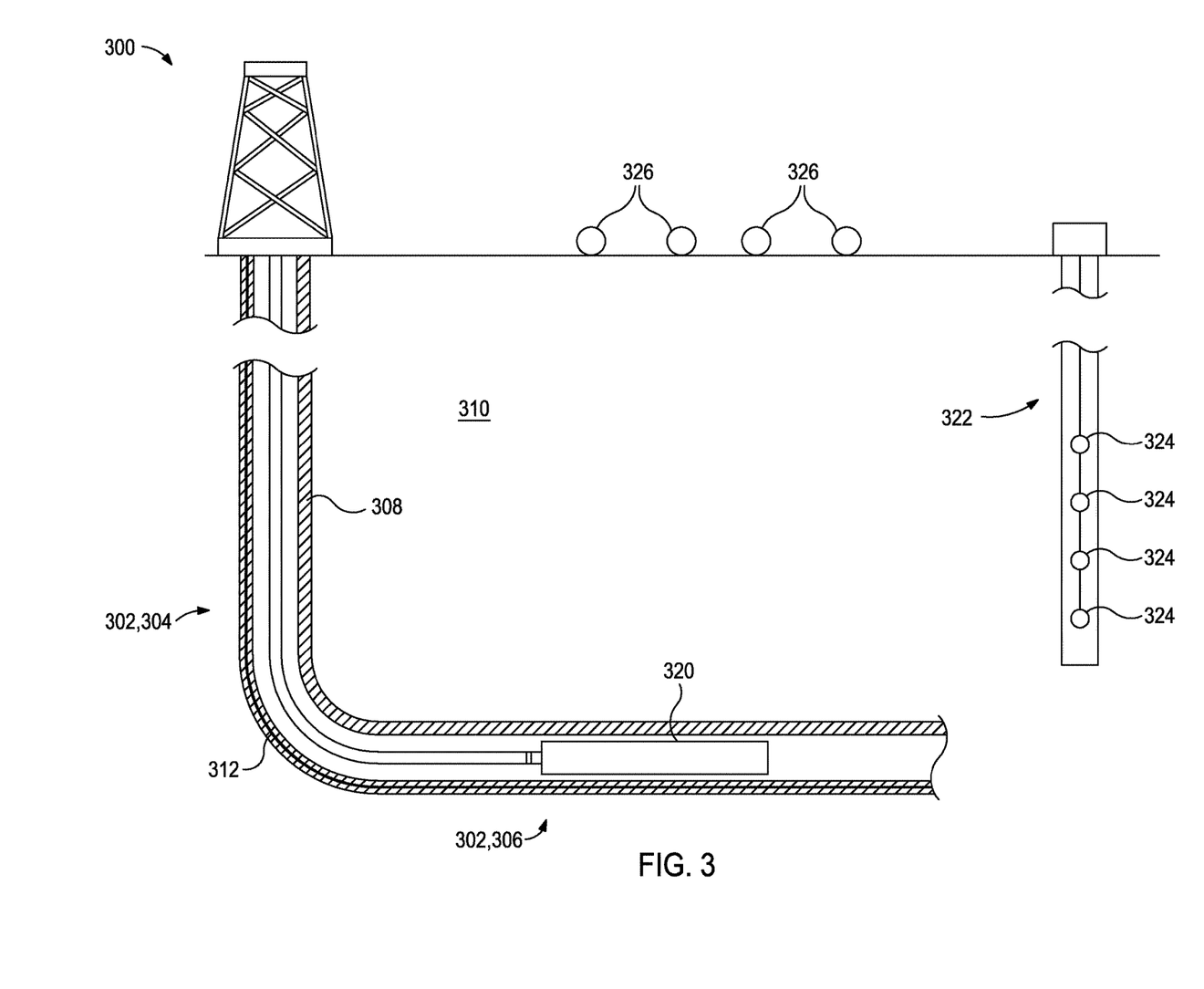
FIG. 3 depicts a schematic diagram of an exemplary system including a horizontal well that may employ the principles of the present disclosure.

FIG. 3 depicts a schematic diagram of an exemplary system 300 that may employ the principles of the present disclosure, according to one or more embodiments. In the illustrated system 300, a wellbore 302 with a vertical section 304 and a horizontal section 306 is lined with the casing 308 cemented therein to support the wellbore 302. Alternatively, a portion of the wellbore 302 may not have a casing, which is referred to as "open hole." For example, the casing 308 may extend from a surface location, such as the Earth's surface, or from an intermediate point between the surface location and the formation 310. In the illustrated system 300, a fiber optic cable 312 extends along the casing 308.

One or more wellbore tools 320, for example, a completion assembly or perforating gun, may be used to prepare the horizontal section 306 for the subsequent extraction of hydrocarbons from the surrounding formation 310. For example, a completion assembly may include a plurality of packers that isolate the various production intervals in the horizontal section 306. In some instances, a fluid (e.g., a stimulation fluid, a treatment fluid, an acidizing fluid, a conformance fluid, or any combination thereof) may be injected into the wellbore 302 or surrounding formation 310 via the wellbore tools 320.

The system 300 also includes an observation well 322 that has a plurality of geophones 324 placed therein for measuring seismic and/or microseismic data. Further, the system 300 includes a plurality of surface geophones 326 for measuring seismic and/or microseismic data.

Embodiments of the present application include, but are not limited to, Embodiment A, Embodiment B, and Embodiment C.

Embodiment A is a method comprising: modeling one selected from the group consisting of petrophysical properties of a subterranean formation, microseismic data associated with treating a complex fracture network in the subterranean formation, and a combination thereof with the mathematical model based on one selected from the group consisting of measured data, microseismic data, completion and treatment data, and a combination thereof to produce one selected from the group consisting of a petrophysical property map, a microseismic data map, and a combination thereof; and correlating a seismic attribute map with one selected from the group consisting of the petrophysical property map, the microseismic data map, and the combination thereof using the mathematical model to produce at least one quantified correlation, wherein the seismic attribute map is a seismic attributed modeled for the complex fracture network.

Embodiment B is a system comprising: a wellbore tool placed along a wellbore extending into a subterranean formation; a non-transitory computer-readable medium coupled to the wellbore tool to receive measured data of the subterranean formation from the wellbore tool and encoded with instructions that, when executed, cause the system to perform the method of Embodiment A.

Embodiment C is a non-transitory computer-readable medium encoded with instructions that, when executed, cause a system to perform the method of Embodiment A.

Optionally Embodiments A, B, and C may include one or more of the following: Element 1: the method further comprising: modeling the seismic attribute for the complex fracture network within the subterranean formation with the mathematical model based on seismic data of the subterranean formation to produce the seismic attribute map; Element 2: the method further comprising: determining a location to drill a wellbore into the subterranean formation so as to intersect the complex fracture network based on the at least one quantified correlation; Element 3: the method further comprising: identifying natural fractures and induced fractures within the complex fracture network; Element 4: wherein the measured data of the subterranean formation is selected from the group consisting of: seismic data, gravimetric data, magnetic data, magnetotelluric data, and any combination thereof; Element 5: the method further comprising: updating a reservoir production model based on the at least one quantified correlation; Element 6: the method further comprising: updating a fracture model based on the at least one quantified correlation; Element 7: the method further comprising: performing a wellbore treatment operation with at least one parameter based on the at least one quantified correlation; and Element 8: drilling or extending a wellbore so that the wellbore intersects the complex fracture network based on the at least one quantified correlation.

Exemplary combinations may include, but are not limited to, Element 1 in combination with one or more of Elements 2-8; Element 7 and/or 8 in combination with one or more of Elements 1-6; Element 3 in combination with Element 2; Element 3 in combination with one or more of Elements 4-8 and optionally in further combination with Element 2; and the like.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

The measured data that was used included well log data, seismic data (negative sonic curvature and positive sonic curvature), and microseismic data (magnitude of microseismic events) for a subterranean formation. Using the seismic data, a fault likelihood volume was created. A mathematical model produced a fault likelihood 3D grid of the formation. The following describes in more detail some of the data analyses and correlations performed by the mathematical model.

Figure 4:
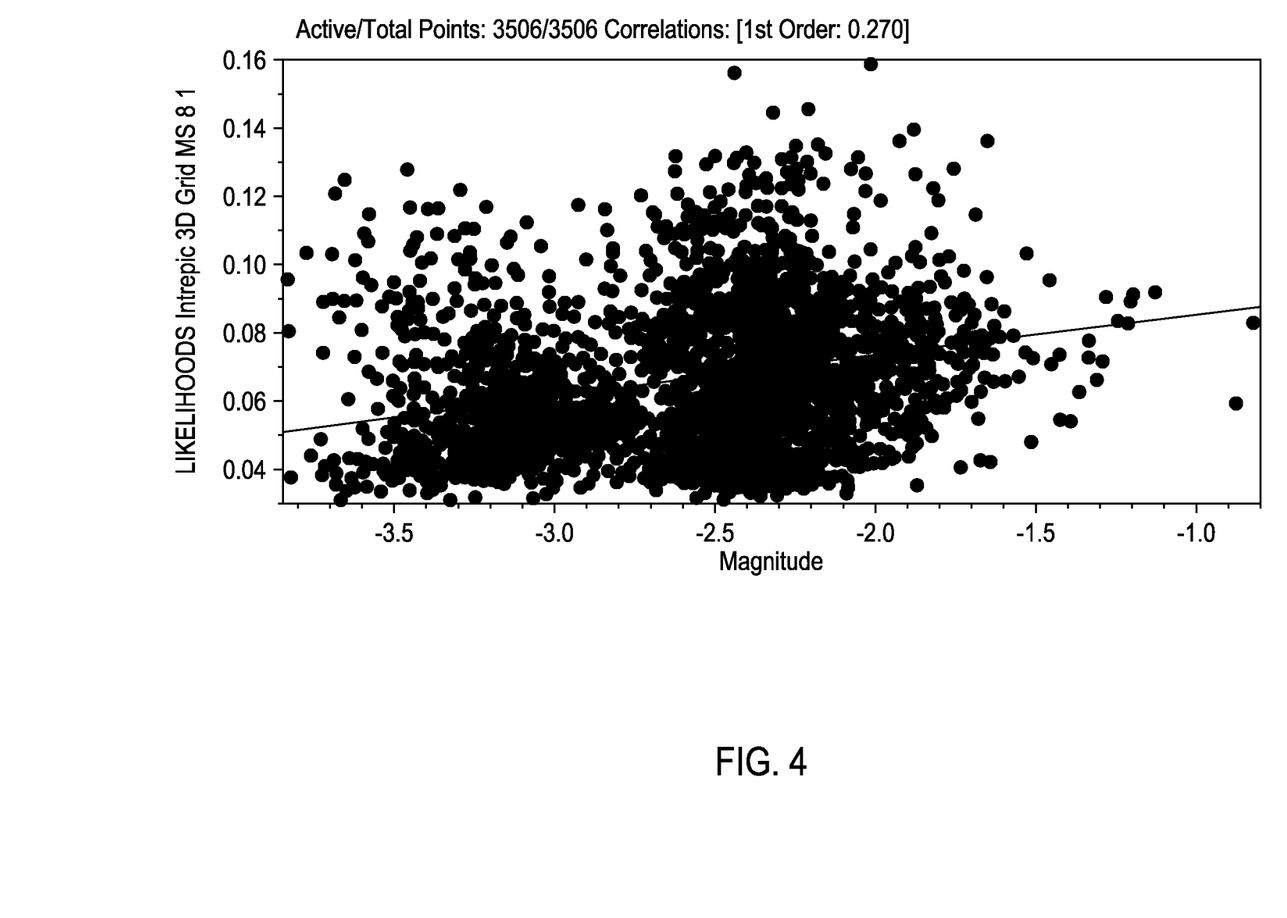
FIG. 4 is a cross-plot of the microseismic magnitude values and the fault likelihood values at the microseismic event location where the relationship was established as a first-order linear regression with a regression line having a measured correlation coefficient (P, also referred to herein as the "correlation") is overlayed.
Figure 5:
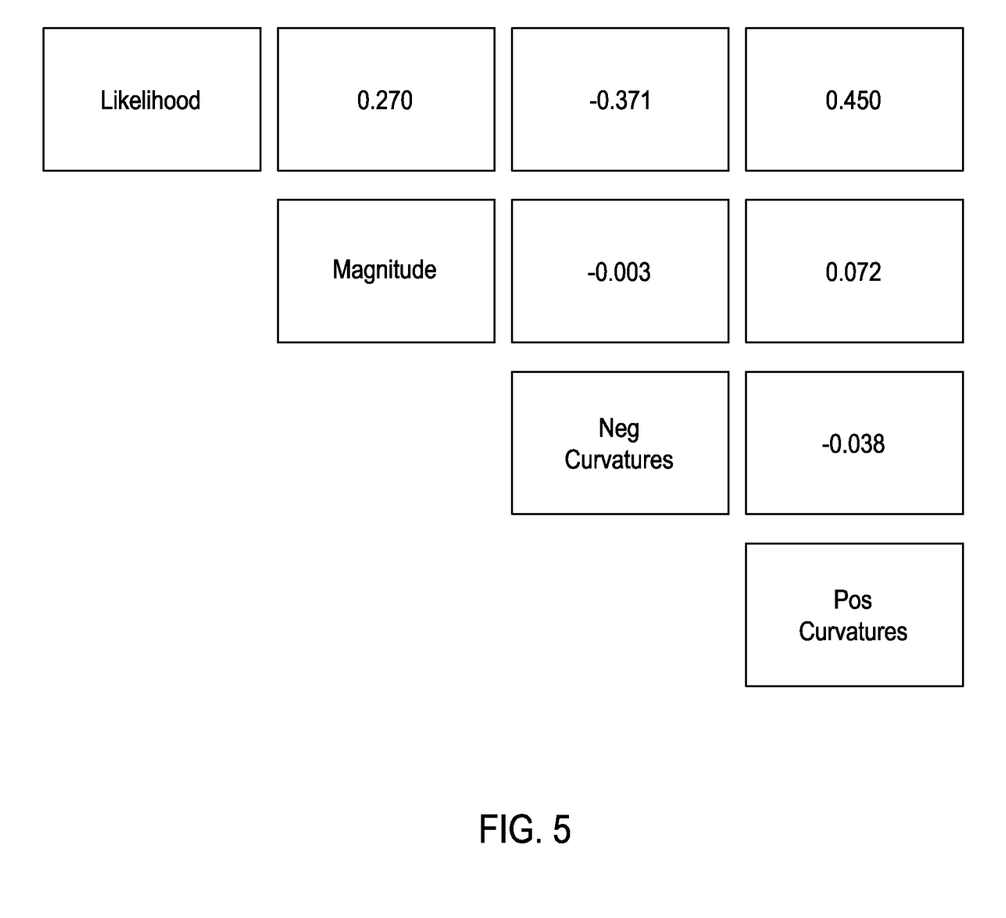
FIG. 5 is a correlation grid for fault likelihood, petrophysical properties, and microseismic data of the subterranean formation.

The mathematical model produced a 3D grid of each of the measured data types and then quantified the correlation each property on the 3D grid to the fault likelihood map using a cross-plot. FIG. 4 is a cross-plot of the microseismic magnitude map and the fault likelihood values on the 3D grid where the first-order correlation line is overlayed, which quantifies the correlation as 0.27. FIG. 5 provides the correlations between the various maps: fault likelihood: microseismic magnitude 0.270, fault likelihood:negative curvature 0.371, and fault likelihood:positive curvature: 0.450. Accordingly, the microseismic data and/or associated maps may be reviewed to identify and delete false data points.

Figure 6:
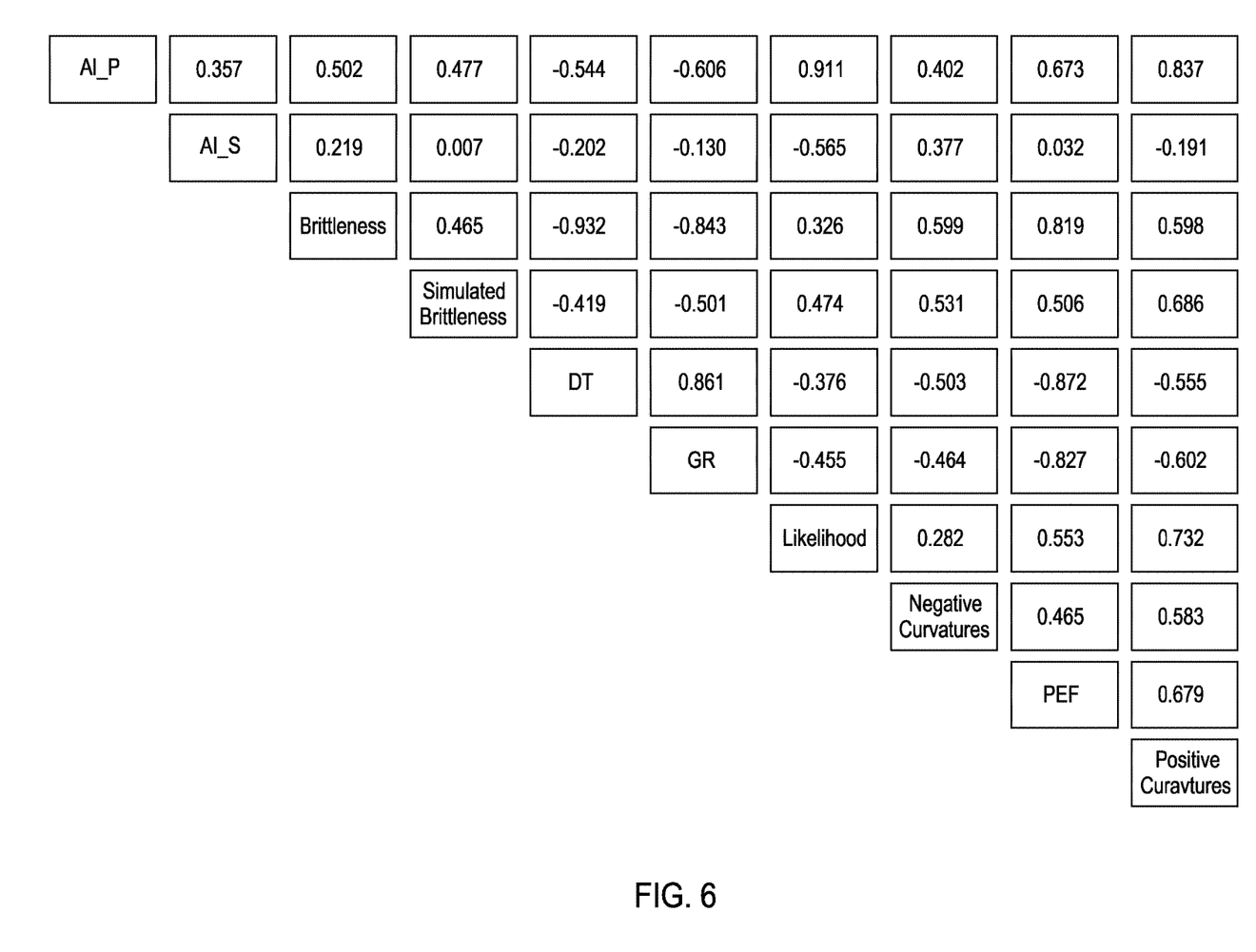
FIG. 6 is a correlation grid for seismic derived fault likelihood, seismic structural attributes and petrophysical properties of the subterranean formation.

In another example, data was measured for a subterranean formation including well log data and measured data (p-wave acoustic impedance, s-wave shear impedance, sonic log (slowness of a sound wave in a formation), gamma ray log, negative curvatures, positive curvatures, and photoelectric factor). Similarly, the fault likelihood 3D grid was produced from the seismic data and correlated to 3d grids corresponding to each of the measured data. Further, the brittleness and simulated brittleness (petrophysical properties) were modeled and mapped on the 3D grid. FIG. 6 provides the correlations between the various grids: fault likelihood:p-wave acoustic impedance 0.911, fault likelihood:s-wave shear impedance −0.565, fault likelihood: brittleness 0.326, fault likelihood:simulated brittleness 0.474, fault likelihood:sonic log −0.376, fault likelihood: gamma ray log −0.455, fault likelihood:negative curvatures 0.282, fault likelihood:positive curvatures 0.679, and fault likelihood:photoelectric factor 0.465. In this example, fault likelihood correlates best with p-wave acoustic impedance, s-wave shear impedance and positive sonic curvatures, and there is also a considerable correlation between fault likelihood and brittleness of the formation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A computer-implemented method comprising:
  modeling, by a computer system coupled to a wellbore tool, one selected from the group consisting of petrophysical properties of a subterranean formation, microseismic data associated with treating a complex fracture network in the subterranean formation, and a combination thereof with a mathematical model based on one selected from the group consisting of measured data, microseismic data, completion and treatment data, and a combination thereof to produce one selected from the group consisting of a petrophysical property map, a microseismic data map, and a combination thereof; and correlating by the computer system, a seismic attribute map with one selected from the group consisting of the petrophysical property map, the microseismic data map, and the combination thereof using the mathematical model to produce at least one quantified correlation, wherein the seismic attribute map is a seismic attributed modeled for the complex fracture network.

2. The computer-implemented method of claim 1, further comprising:
modeling the seismic attribute for the complex fracture network within the subterranean formation with the mathematical model based on seismic data of the subterranean formation to produce the seismic attribute map.

3. The computer-implemented method of claim 1, further comprising:
determining a location to drill a wellbore into the subterranean formation so as to intersect the complex fracture network based on the at least one quantified correlation.

4. The computer-implemented method of claim 1, further comprising:
identifying natural fractures and induced fractures within the complex fracture network.

5. The computer-implemented method of claim 1, wherein the measured data of the subterranean formation is selected from the group consisting of: seismic data, gravimetric data, magnetic data, magnetotelluric data, and any combination thereof.

6. The computer-implemented method of claim h further comprising:
updating a reservoir production model based on the at least one quantified correlation.

7. The computer-implemented method of claim 1, further comprising:
updating a fracture model based on the at least one quantified correlation.

8. The computer-implemented method of claim 1, further comprising:
performing a wellbore treatment operation with at least one parameter based on the at least one quantified correlation.

9. The computer-implemented method of claim 1, further comprising:
drilling or extending a wellbore so that the wellbore intersects the complex fracture network based on the at least one quantified correlation.

10. A system comprising:
a wellbore tool placed along a wellbore extending into a subterranean formation;
a non-transitory computer-readable medium coupled to the wellbore tool to receive measured data of the subterranean formation from the wellbore tool and encoded with instructions that, when executed, cause the system to perform operations comprising:
modeling one selected from the group consisting of petrophysical properties of a subterranean formation, microseismic data associated with treating a complex fracture network in the subterranean formation, and a combination thereof with of measured data, microseismic data, completion and treatment data, respectively, to produce one selected from the group consisting of a petrophysical property map, a microseismic data map, and a combination thereof, respectively; and correlating a seismic attribute map with one selected from the group consisting of the petrophysical property map, the microseistnic data map, and the combination thereof using a. mathematical model to produce at least one quantified correlation, wherein the seismic attribute map is a seismic attributed modeled for the complex fracture network.

11. The system of claim 10, wherein the instructions that, when executed, cause the system to perform operations that further comprise:
modeling the seismic attribute for the complex fracture network within the subterranean formation with the mathematical model based on seismic data of the subterranean formation to produce the seismic attribute map.

12. The system of claim 10, wherein the instructions that, when executed, cause the system to perform operations that further comprise:
determining a location to drill a wellbore into the subterranean formation so as to intersect the complex fracture network based on the at least one quantified correlation.

13. The system of claim 10, wherein the instructions that, when executed, cause the system to perform operations that further comprise:
identifying natural fractures and induced fractures within the complex fracture network.

14. The system of claim 10, wherein the measured data of the subterranean formation is selected from the group consisting of: seismic data, gravimetric data, magnetic data, magnetotelluric data, and any combination thereof.

15. The system of claim 10, wherein the instructions that, when executed, cause the system to perform operations that further comprise:
updating a reservoir production model based on the at least one quantified correlation.

16. The system of claim 10, wherein the instructions that, when executed, cause the system to perform operations that further comprise:
updating a fracture model based on the at least one quantified correlation.

17. A non-transitory computer-readable medium encoded with instructions that, when executed, cause a system to perform operations comprising:
modeling one selected from the group consisting of petrophysical properties of a subterranean formation, microseismic data associated with treating a complex fracture network in the subterranean formation, and a combination thereof with of measured data, microseismic data, completion and treatment data, respectively, to produce one selected from the group consisting of a petrophysical property map, a microseismic data map, and a combination thereof, respectively; and correlating a seismic attribute map with one selected from the group consisting; of the petrophysical property map, the microseismic data map, and the combination thereof using a mathematical model to produce at least one quantified correlation, wherein the seismic attribute map is a seismic attributted modeled for the complex fracture network.

18. The non-transitory computer-readable medium of claim 17, wherein the instructions that, when executed, cause the system to perform operations that further comprise:
 modeling the seismic attribute for the complex fracture network within the subterranean formation with the mathematical model based on seismic data of the subterranean formation to produce the seismic attribute map.

19. The non-transitory computer-readable medium of claim 17, wherein the instructions that, when executed, cause the system to perform operations that further comprise:
 determining a location to drill a wellbore into the subterranean formation so as to intersect the complex fracture network based on the at least one quantified correlation.

20. The non-transitory computer-readable medium of claim 17, wherein the instructions that, when executed, cause the system to perform operations that further comprise:
 identifying natural fractures and induced fractures within the complex fracture network.

\* \* \* \* \*

UNITED STATES PATENT AND TRADEMARK OFFICE
CERTIFICATE OF CORRECTION

| | | |
|---|---|---|
| PATENT NO. | : 11,099,289 B2 | Page 1 of 1 |
| APPLICATION NO. | : 16/331635 | |
| DATED | : August 24, 2021 | |
| INVENTOR(S) | : Ashwani Dev et al. | |

It is certified that error appears in the above-identified patent and that said Letters Patent is hereby corrected as shown below:

In the Claims

Column 11, Line 38, change "claim h" to -- claim 1 --

Column 12, Line 8, change "microseistnic" to -- microseismic --

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*